United States Patent [19]

Hoelzer

[11] Patent Number: 4,544,685
[45] Date of Patent: Oct. 1, 1985

[54] INSULATION JACKETING MATERIAL

[75] Inventor: Robert J. Hoelzer, Westfield, N.J.

[73] Assignee: Manville Service Corporation, Denver, Colo.

[21] Appl. No.: 659,467

[22] Filed: Oct. 10, 1984

[51] Int. Cl.$^4$ .......................... C08K 9/02; C08K 3/02; C08K 3/10; C08K 5/58

[52] U.S. Cl. ..................... 523/200; 523/210; 524/114; 524/406; 524/413; 524/569; 428/920

[58] Field of Search ............... 524/114, 406, 413, 180; 523/200, 210; 428/383, 389, 390, 391, 920

[56] References Cited

U.S. PATENT DOCUMENTS

| | | | |
|---|---|---|---|
| 3,941,908 | 3/1976 | Valia et al. | 523/451 |
| 3,944,717 | 3/1976 | Hacker et al. | 524/472 |
| 3,957,723 | 5/1976 | Lawson et al. | 524/432 |
| 3,966,673 | 6/1976 | Frick et al. | 524/788 |
| 3,983,290 | 9/1976 | Elick | 524/411 |
| 4,058,471 | 11/1977 | Glatti et al. | 524/433 |
| 4,071,652 | 1/1978 | Brullo | 428/336 |
| 4,147,690 | 4/1979 | Rich | 524/437 |
| 4,159,261 | 6/1979 | Dieckmann | 524/175 |
| 4,169,819 | 10/1979 | Shiohara et al. | 524/306 |
| 4,213,487 | 7/1980 | Funk et al. | 428/463 |
| 4,447,569 | 5/1984 | Brecker et al. | 524/425 |
| 4,456,654 | 6/1984 | Kotian | 428/390 |
| 4,456,733 | 6/1984 | Hornbaker | 525/301 |

Primary Examiner—Herbert J. Lilling
Attorney, Agent, or Firm—John D. Lister; Gregory A. Evearitt

[57] ABSTRACT

A composition having excellent anti-smoke properties and useful as a jacketing for pipe insulation and the such is provided. The composition can be thermoformed into an insulation jacketing product having a high delayed ignition time, a smoke development rating of 50 or less, and a flame spread rating of 25 or less as measured by ASTM E84.

10 Claims, No Drawings

INSULATION JACKETING MATERIAL

This invention relates to a novel composition useful as an insulation jacketing material especially for covering the thermal insulation of pipes, valves, and other similar structures.

Each year countless lives and untold amounts worth of property damages are lost due to ravages of fires in homes and buildings. When fires start in an enclosed structure the flames and generated smoke can spread very quickly thereby increasing the likelihood of blocking possible escape exits and also increasing the concentration of noxious gases such as carbon monoxide.

Because of the terrible destruction that such fires cause, many jurisdictions are adopting increasingly restrictive building codes. For example, many cities have already adopted or are currently moving towards the adoption of the so-called "25/50" code which is a very stringent rating system adapted for building materials to include pipes, valves and other similar structures.

Specifically, the "25/50" code requires various building materials to have a flame spread rating of 25 or less and a smoke development rating of 50 or less, both ratings being given according to test results conducted in accordance with ASTM E84.

Essentially, the flame spread rating is a relative measure of how much the flame spreads across the particular material while the smoke development rating is a relative measure of how much smoke is generated by the building material. In both instances, the lower the relative rating the better a performance is indicated. For example, a smoke development rating of 45 is significantly better than one of 125.

The use of polyvinyl chloride (hereinafter simply referred to as PVC) based materials as insulation jacketing products in the building industry is common. However, one of the problems currently facing the use of such PVC based materials as insulation jacketing for pipes and other structures is that such existing products can generally not pass the stringent "25/50" code requirements which several jurisdictions have adopted. Furthermore, the so-called delayed ignition times of such products, also tested according to ASTM E84, are also relatively low. The delayed ignition time is a measure of how quickly the particular material catches on fire. Consequently, the higher the delayed ignition time the better fire protection properties the material has.

Research was conducted in order to find a PVC based insulation jacketing material which would overcome the above mentioned problems, i.e. pass the "25/50" test and have a good delayed ignition time. As a result of such research, it was found that a combination of particular materials which alter the thermal degradation of PVC, certain heat stabilizers, and lubricants resulted in a PVC based material which had superior insulation jacketing properties. The inventive composition was found to not only meet the "25/50" code requirements but to have a high delayed ignition time as well.

It is therefore an object of this invention to provide a novel PVC based composition which makes an extremely good insulation jacketing material for the building industry because it meets the restrictive requirements of the "25/50" Code and has a high delayed ignition time.

Other aspects, objects, and the several advantages of the present invention are apparent from the specification and the appended claims.

In accordance with the present invention there is provided a composition which has the aforementioned excellent properties. The general and preferred formulations for the inventive composition are listed below:

| Ingredient | Percent by Weight |
| --- | --- |
| GENERAL INVENTIVE FORMULATION | |
| PVC Resin | 54–60 |
| Heat Stabilizer(s) | 1.5–4 |
| Lubricants | 0.5–4.5 |
| Chlorinated Polyethylene | 6–8 |
| Titanium Dioxide | 8–10 |
| Ground Aluminum and/or Magnesium Hydroxide | 18–20.5 |
| Molybdenum Trioxide | 3–4 |
| PREFERRED INVENTIVE FORMULATION | |
| PVC Resin | 57.0 |
| Butyl Tin Mercaptide | 1.9 |
| Epoxidized Soybean Oil | 1.2 |
| Calcium Stearate | 0.9 |
| Esterified Montan Wax | 0.4 |
| Polyethylene Wax | 0.1 |
| Titanium Dioxide | 8.6 |
| Chlorinated Polyethylene, nominal 36 percent Cl | 7.1 |
| Molybdenum Trioxide | 3.4 |
| Ground Aluminum Hydroxide | 19.4 |
| Surface Treated with Stearic Acid | |
| TOTAL OF INGREDIENTS | 100.0 |

Any commercially available resin with an Inherent Viscosity (IV) of from about 0.70–1.09, preferably about 0.80–0.83 (as measured at ASTM D 1243) may be used in the present invention. Alternatively, any PVC resin with a GP-2 to GP-5 rating, preferably GP-3, (as mentioned by ASTM D 1755) may be utilized in the present invention. The PVC resin will usually be a homopolymer with about 57% chlorine content.

Generally, any commercially available heat stablizers which will impart thermal stability to the present invention during and after processing may be utilized. Specifically, organo tin mercaptides such as methyl, octyl, and butyl (preferred) tin mecaptides and epoxidized vegetable oils such as epoxidized linseed oils and epoxidized soybean oils (presently preferred) have been found to be good heat stabilizers in the present invention. Generally, the organo tin mercaptide should be present individually in an amount in the range of about 1.0 to 2.5 wt.% in the inventive composition while the epoxidized vegetable oil can be present individually in the range of from about 0.5 to 1.5 wt.%.

While it is thought that any compatible lubricating agents (internal and external) may be used, the following have been found to be specifically useful in the present invention and can be utilized individually at the recommended wt.% levels: metal salts of fatty acids (calcium stearate preferred) 0.4–3.0; esterified waxes such as pentaerythritol adipate stearate and Montan Wax (preferred) 0.2–1.0; and polyethylene or partially oxidized polyethylene waxes, 0.05 to 0.5.

Any commercially available chlorinated polyethylene and preferably a nominal 36 percent Cl polyethylene may be used. The addition of the chlorinated polyethylene to the present invention helps to add impact resistance to the final insulation product.

Generally, any commercially available grades of titanium dioxide and molybdenum trioxide may be employed in the present invention.

Although it is thought that general ground-up forms of both Al(OH)$_3$ (preferred) and Mg(OH)$_2$ may be utilized, it is preferred that both forms have been surface treated (typically by dry mixing) with a fatty acid, preferably stearic acid.

Although not meant to be bound by any particular theory for purposes of patentability of the present invention, it is thought that the titanium dioxide, molybdenum trioxide, and magnesium and/or aluminum hydroxide act in combination with the other above mentioned ingredients to alter the thermal degradation pattern of PVC to delay ignition, to reduce the spread of flame, and to reduce the formation of relatively dense smoke-producing aromatic hydrocarbons (e.g. benzene, toluene, naphthalene) thereby providing a desirably low smoke development rating.

The invention composition is made into an insulation material by first thoroughly dry mixing the various formulation ingredients. After an intimate mixture is achieved and the mixture is subsequently cooled to yield a relatively uniform dry-blend powder compound, the latter is then transferred to an extruder where the powder is fluxed, further mixed, and forced through a die, exiting as a hot, soft continuous sheeting which is subsequently cooled on a roll stack. The sheeting is then either wound into master rolls or periodically cut into various sizes of flat sheets for further processing. Such cut sheets can then be thermoformed into the final insulation product by the process of reheating the sheet to the previous extrusion temperature then by means of a vacuum press the heated soft sheet is placed against an appropriate mold to form the desired product shape and dimensions, and finally the sheet is cooled on the mold.

As an alternative to the extrusion process, it is also within the scope of the present invention to make the inventive thermal insulation by calendering the relatively uniform dry-blend powder compound into sheets which can then be thermoformed into the desired product.

The following Example further illustrates the present invention.

EXAMPLE

A series of PVC based compounds of varying formulations were made into a sheet material according to the generalized procedure outlined earlier in the specification. The specific fomulation ingredients of each compound along with their particular weight levels in parts per hundred (based upon 100 parts of PVC resin) are given in TABLE A.

Each resulting formed sheet material was then tested for flame spread, smoke generation, and delayed ignition characteristics according to ASTM Test Procedure E84. The results are given in Table B.

Materials 1–10 are non-inventive and are given for comparative purposes while Material 11 is an inventive composition containing each ingredient at the following weight percentage level: PVC resin, 57.01%; butyl tin mercaptide, 1.94%; epoxidized soybean oil, 1.19%; calcium stearate, 0.85%; esterified Montan Wax, 0.39%; polyethylene wax, 0.12%; titanium dioxide, 8.55%; chlorinated polyethylene (nominal 36 percent Cl), 7.13%; molybdenum trioxide, 3.42%, and ground, surface treated aluminum hydroxide, 19.38%.

TABLE A

| INGREDIENTS (Parts per hundred PVC) | MATERIAL NO. | | | | | | | | | | |
|---|---|---|---|---|---|---|---|---|---|---|---|
| | 1 | 2 | 3 | 4 | 5 | 6 | 7 | 8 | 9 | 10 | 11 |
| PVC Resin[a] | 100 | 100 | 100 | 100 | 100 | 100 | 100 | 100 | 100 | 100 | 100 |
| Butyl Tin Mercaptide[b] | 3.05 | 4.00 | 4.00 | 4.00 | 4.00 | 4.00 | 3.40 | 3.40 | 3.40 | 3.40 | 3.40 |
| Epoxidized Soybean Oil[c] | 2.03 | 3.00 | 3.00 | 3.00 | 3.00 | 3.00 | 2.10 | 2.10 | 2.10 | 2.10 | 2.10 |
| Calcium Stearate | 1.25 | 2.10 | 2.10 | 2.10 | 2.10 | 2.10 | 1.50 | 1.50 | 1.50 | 1.50 | 1.50 |
| Esterified Montan Wax[d] | 0.70 | 0.72 | 0.72 | 0.72 | 0.72 | 0.72 | 0.70 | 0.70 | 0.70 | 0.70 | 0.70 |
| Polyethylene Wax[e] | 0.21 | 0.22 | 0.22 | 0.22 | 0.22 | 0.22 | 0.21 | 0.21 | 0.21 | 0.21 | 0.21 |
| Titanium Dioxide | 12.00 | 6.00 | 6.00 | 6.00 | 6.00 | 6.00 | 15.00 | 15.00 | 15.00 | 15.00 | 15.00 |
| Magnesium Silicate(Talc) | 12.00 | — | — | — | — | — | — | — | — | — | — |
| Chlorinated Polyethylene (Nom. 36% Cl) | 7.50 | 12.50 | 12.50 | 12.50 | 12.50 | 12.50 | 12.50 | 12.50 | 12.50 | 12.50 | 12.50 |
| Modified Acrylic Resin[f] | 7.50 | — | — | — | — | — | — | — | — | — | — |
| Molybdenum Trioxide[g] | — | — | — | — | 2.00 | 2.00 | — | 2.00 | 6.00 | — | 6.00 |
| Aluminum Hydroxide | — | — | 25.00* | 25.00* | 16.00* | 16.00* | 40.00* | 38.00* | 34.00* | 30.00* | 34.00** |
| Calcium Carbonate | — | 20.00 | 20.00 | 20.00 | 28.80 | 28.80 | — | — | — | — | — |
| Ferrocene | — | — | — | 0.50 | — | 0.50 | — | — | — | — | — |
| Zinc Borate | — | — | — | — | — | — | — | — | — | 10.00 | — |
| Color of Extruded Sheet | White | White | White | Light Yellow | Very Light Gray | Greenish Gray | White | Very Light Gray | Light Gray | White | Light Gray |

NOTES
[a]TENNECO ® PVC 200 (a GP-3 type as measured by ASTM D 1755)
[b]STANCLERE ® T-803Z marketed by Akzo Chemie America
[c]PARAPLEX ® G-62 from C.P. Hall Co.
[d]WAX E ® from American Hoechst
[e]AC 617A from Allied Chemical Co.
[f]DURA STRENGTH ® 200 from M&T Chemicals
[g]Grade L-U from Amax Inc.
*Precipitated, type Alcoa Grade HYDRAL ® 710
**Ground-up, Surface-treated with Stearic Acid type SOLEM ® 632-SL from Solem Industries.

TABLE B

| ASTM E84 TEST DATA* | MATERIAL NO. | | | | | | | | | | |
|---|---|---|---|---|---|---|---|---|---|---|---|
| | 1 | 2 | 3 | 4 | 5 | 6 | 7 | 8 | 9 | 10 | 11 |
| Time to ignition, Seconds | 12 | 5 | 5 | 5 | 5 | 6 | 10 | 9 | 14 | 6 | 22 |
| | 11 | | 7 | | 4 | 6 | 10 | 9 | 12 | | 30 |
| | 11 | | | | 6 | 5 | 10 | | 14 | | 17 |

TABLE B-continued

| ASTM E84 TEST DATA* | MATERIAL NO. | | | | | | | | | | |
|---|---|---|---|---|---|---|---|---|---|---|---|
| | 1 | 2 | 3 | 4 | 5 | 6 | 7 | 8 | 9 | 10 | 11 |
| Flame Spread, Factor | 19.8 | 12.6 | 12.4 | 14.8 | 15.0 | 14.9 | 6 | 14.5 | 8 | 12.0 | 11.9 |
| | 19.8 | | 15.0 | | 14.9 | 14.8 | 9.9 | 12.2 | 9.5 | | 7.2 |
| | 17.9 | | | | 14.7 | 15.9 | 12.1 | | 12.0 | | 12.1 |
| | | | | | | | 12.2 | | 9.7 | | |
| | | | | | | | 12.1 | | 12.1 | | |
| Smoke Developed, Factor | 149.8 | 249.0 | 136.5 | 164.8 | 112.5 | 123.0 | 109.2 | 99.5 | 51.3 | 110.5 | 45.2 |
| | 169.7 | | 140.8 | | 97.7 | 101.0 | 140.6 | 83.4 | 51.8 | | 35.7 |
| | 204.5 | | | | 124.2 | 138.0 | 122.5 | | 63.3 | | 37.8 |
| | | | | | | | 122.7 | | 51.5 | | |

*20 MIL(.020")Sheet Thickness

The data in Table B indicate that the inventive composition (No. 11) out-performed in all instances the other non-inventive more typical PVC based compositions (No.'s 1-10) with regard to both the delayed ignition time and the smoke development factor, and in most instances the flame spread factor. Inventive Material No. 11 had very high ignition time in general, reaching an unusually high delayed ignition time of 30 seconds. In addition, Material No. 11 was the only material tested to have both a flame spread factor of 25 or less and a smoke development factor of 50 or less. In fact, No. 11 shows a flame spread factor of below 25 in all instances as well as smoke development factors well below 50.

As can also be seen by the data in Table A, the inventive Material No. 11 has a light gray tint which gives the final product a pleasing appearance. Notice that non-inventive Material No.'s 4 and 6 resulted in products which would have been darker than desired.

Thus, the data in Table B, show that the inventive Material No. 11 is an excellent insulation jacketing material which can pass the stringent "25/50" code requirements as well as offer an excellent delayed ignition time as measured in accordance with ASTM E84.

Reasonable variations and modifications of the foregoing are possible without departing from either the spirit or scope of the present invention.

I claim:

1. A composition useful as an insulation jacketing material having excellent anti-smoke properties comprising the following ingredients:
   (a) about 54-60 wt% polyvinyl chloride resin having an Inherent Viscosity of from about 0.70-1.09 as measured by ASTM D 1243;
   (b) about 1.5-4 wt% of at least one heat stabilizer;
   (c) about 0.5-4.5 wt% of at least one lubricant;
   (d) about 6-8 wt% chlorinated polyethylene;
   (e) about 8-10 wt% titanium dioxide;
   (f) about 18-20.5 wt% of at least one compound selected from the group consisting of (i) ground aluminum hydroxide and (ii) ground magnesium hydroxide wherein said compound is surface treated with a fatty acid; and
   (g) about 3-4 wt% molybdenum trioxide.

2. A composition according to claim 1 wherein said heat stabilizers in 1(b) are an organo tin mercaptide and an epoxidized vegetable oil.

3. A composition according to claim 1 wherein said lubricants in 1(c) are metal salts of fatty acids, esterified waxes, and polyethylene waxes.

4. A composition according to claim 1 wherein said chlorinated polyethylene is 36 percent chlorinated polyethylene.

5. A composition according to claim 1 wherein said fatty acid is stearic acid.

6. A composition having excellent anti-smoke properties consisting essentially in weight percent the following ingredients:
   (a) about 57 wt% polyvinylchloride resin having an Inherent Viscosity of from about 0.70 to 1.09 as measured by ASTM D 1243;
   (b) about 1.9 wt% butyl tin mercaptide;
   (c) about 1.2 wt% epoxidized soybean oil;
   (d) about 0.9 wt% calcium stearate;
   (e) about 0.4 wt% Esterified Montan Wax;
   (f) about 0.1 wt% polyethylene wax;
   (g) about 8.6 wt% titanium dioxide;
   (h) about 7.1 wt% nominal 36 percent Cl polyethylene;
   (i) about 3.4 wt% molybdenum trioxide; and
   (j) about 19.4 wt% ground Al(OH)$_3$ surface treated with stearic acid.

7. A thermal insulation jacketing thermoformed from the composition of claim 1.

8. A thermal insulation jacketing thermoformed from the composition of claim 1 and having a flame spread rating of 25 or less and a smoke development rating of 50 or less as measured by ASTM E84.

9. A thermal insulation jacketing thermoformed from the composition of claim 6.

10. A thermal insulation jacketing thermoformed from the composition of claim 6 and having a flame spread rating of 25 or less and a smoke development rating of 50 or less as measured by ASTM E84.

* * * * *